(12) United States Patent
Tomiyama et al.

(10) Patent No.: US 7,929,395 B2
(45) Date of Patent: Apr. 19, 2011

(54) MULTILAYER INFORMATION RECORDING MEDIUM

(75) Inventors: Morio Tomiyama, Nara (JP); Masahiko Tsukuda, Osaka (JP); Haruhiko Habuta, Osaka (JP)

(73) Assignee: Panasonic Corporation, Osaka (JP)

( * ) Notice: Subject to any disclaimer, the term of this patent is extended or adjusted under 35 U.S.C. 154(b) by 415 days.

(21) Appl. No.: 12/293,303

(22) PCT Filed: Mar. 22, 2007

(86) PCT No.: PCT/JP2007/055866
§ 371 (c)(1),
(2), (4) Date: Sep. 17, 2008

(87) PCT Pub. No.: WO2007/108507
PCT Pub. Date: Sep. 27, 2007

(65) Prior Publication Data
US 2009/0290467 A1 Nov. 26, 2009

(30) Foreign Application Priority Data

Mar. 22, 2006 (JP) .................................. 2006-078398

(51) Int. Cl.
*G11B 7/00* (2006.01)
(52) U.S. Cl. .......................................... 369/94; 369/284
(58) Field of Classification Search .................. None
See application file for complete search history.

(56) References Cited

U.S. PATENT DOCUMENTS

| 2004/0139459 A1 | 7/2004 | Mishima et al. |
| 2006/0062133 A1 | 3/2006 | Tsukagoshi et al. |
| 2007/0189147 A1* | 8/2007 | Miyamoto et al. ......... 369/275.1 |
| 2007/0242596 A1* | 10/2007 | Ootera et al. ............. 369/275.1 |

FOREIGN PATENT DOCUMENTS

| JP | 2004-213720 | 7/2004 |
| JP | 2005-285222 | 10/2005 |
| JP | 2006-040342 | 2/2006 |
| JP | 2006-073053 | 3/2006 |

OTHER PUBLICATIONS

Form PCT/ISA/237 (Opinion of the Examiner) for corresponding Application No. PCT/JP2007/055866 dated Jun. 19, 2007 and a partial English translation.
International Search Report for corresponding Application No. PCT/JP2007/055866 dated Jun. 19, 2007.

* cited by examiner

*Primary Examiner* — Joseph Haley
(74) *Attorney, Agent, or Firm* — Renner, Otto, Boisselle & Sklar, LLP (57) ABSTRACT

A multilayer information storage medium according to the present invention includes: a substrate; at least three information storage layers, which are stacked one upon the other on the substrate; a plurality of transparent layers, each of which is arranged between its associated adjacent ones of the information storage layers; and a transparent coating layer. At least two of the transparent layers have mutually different thicknesses. If a laser beam with a wavelength of 400 nm to 410 nm is incident perpendicularly on the medium through the transparent coating layer, two of the information storage layers that sandwich the thinnest one of the transparent layers have a higher returning light intensity and/or a higher degree of modulation than the other information storage layers.

5 Claims, 2 Drawing Sheets

MULTILAYER INFORMATION RECORDING MEDIUM

TECHNICAL FIELD

The present invention relates to a multilayer information storage medium with multiple storage layers, from/to which information is read or written.

BACKGROUND ART

Recently, as the amount of information to be processed by various types of information processing and audiovisual devices has been further increasing, more and more attention is paid to information storage media, which allow the user to easily access the data stored there, which can store a huge size of data, and which can effectively contribute to reducing the sizes of those devices. Meanwhile, various methods have been developed and proposed to store information on an information storage medium as densely as possible. As such an information storage medium with huge storage capacity (or high density), an information storage medium, from/to which information is read or written using a recorder/player that has an optical head including a laser light source with a wavelength of approximately 400-410 nm and a condenser lens with a numerical aperture (NA) of 0.85, has been proposed. For example, there is an information storage medium that can store data of approximately 25 GB per storage layer, i.e., approximately 50 GB for two storage layers combined. Also, some people are trying to increase the storage capacity by stacking a number of storage layers one upon the other with a transparent layer sandwiched between them (see Patent Document No. 1, for example).

The structure of a multilayer information storage medium as disclosed in Patent Document No. 1 will be described with reference to FIG. 3.

Figure 3:
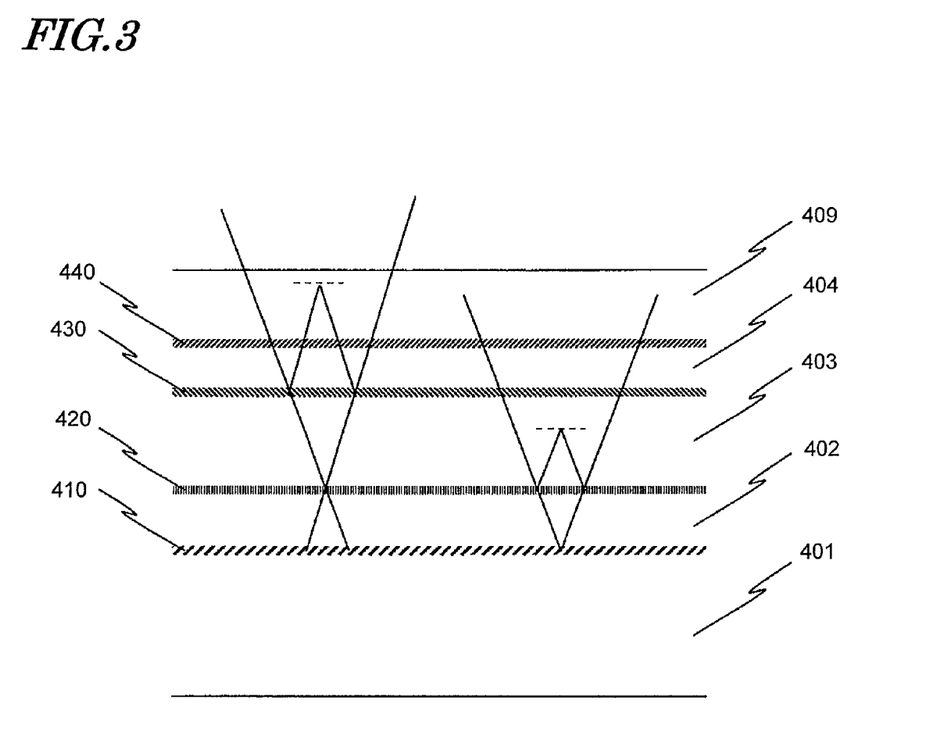
FIG. 3 is a cross-sectional view illustrating an example of a multilayer information storage medium.

FIG. 3 is a cross-sectional view of the multilayer information storage medium. This storage medium includes a substrate 401, transparent layers 402 to 404, a transparent coating layer 409, an L0 layer 410 arranged between the substrate 401 and the transparent layer 402, an L1 layer 420 arranged between the transparent layers 402 and 403, an L2 layer 430 arranged between the transparent layers 403 and 404, and an L3 layer 440 arranged between the transparent layer 404 and the transparent coating 409. The L0 through L3 layers are information storage layers.

To perform a read or write operation on this multilayer information storage medium, the medium is irradiated with a laser beam that has come through the transparent coating layer 409, and one of the L0 to L3 layers is accessed by shifting the focal point of the laser beam, which has been converged by the objective lens of a read/write head, to the target layer, thereby reading or writing data. Supposing the thicknesses of the transparent layers 402, 403 and 404 are identified by A, B and C, these transparent layers satisfy the inequality C<A<B. This inequality is preferably satisfied to prevent an interlayer crosstalk (or noise) from being produced due to interference between the laser beam (read radiation) that has been focused on, and then reflected from, the target L0 or L1 layer 410 or 420 and another laser beam that has been accidentally focused on, and then reflected from, another information storage layer that is located closer to the transparent coating layer 409 than the target layer is.

Patent Document No. 1: Japanese Patent Application Laid-Open Publication No. 2004-213720

DISCLOSURE OF INVENTION

Problems to be Solved by the Invention

To minimize read/write errors that will be caused due to the presence of scratches or dust on the surface of the transparent coating layer, the transparent coating layer is preferably as thick as possible. Meanwhile, to minimize the aberration that will be produced if the total thickness of the transparent coating layer and the transparent layers that the laser beam should go through to reach the target information storage layer (i.e., the optical path length) increases, the total thickness of those transparent layers should be reduced. However, if the thicknesses of those transparent layers are just reduced, then an interlayer crosstalk will also be produced because in a pair of information storage layers that are stacked one upon the other with the thinnest transparent layer interposed between them, a signal generated from one of the two layers could easily leak into a signal read from the other layer.

For these reasons, if a multilayer information storage medium is made just by stacking a number of information storage layers, each of which would achieve signal quality (which will be represented herein by signal jitter) of a similar level when used by itself as the only information storage layer, then some of those information storage layers would produce significant jitter because those layers would be affected by the interlayer crosstalk to mutually different degrees. And one of the information storage layers that is affected by the interlayer crosstalk most seriously would produce quite noticeable signal jitter. In that case, information could be neither read nor written as intended from/on such a multilayer information storage medium.

The present invention has an object of providing a multilayer information storage medium that can reduce the signal jitter produced by such an information storage layer, which is affected by the interlayer crosstalk seriously, so as to read and write information from/on it just as intended.

Means for Solving the Problems

A multilayer information storage medium according to the present invention includes: a substrate; at least three information storage layers, which are stacked one upon the other on the substrate; a plurality of transparent layers, each of which is arranged between its associated adjacent ones of the information storage layers; and a transparent coating layer. At least two of the transparent layers have mutually different thicknesses. If a laser beam with a wavelength of 400 nm to 410 nm is incident perpendicularly on the medium through the transparent coating layer, two of the information storage layers that sandwich the thinnest one of the transparent layers have a higher returning light intensity and/or a higher degree of modulation than the other information storage layers.

In one preferred embodiment the medium includes four information storage layers. The transparent layers arranged between those information storage layers have mutually different thicknesses. And if the thicknesses of the transparent layers are identified by A, B and C in the order of closeness to the substrate, then A, B and C satisfy the inequality C<A<B.

In another preferred embodiment, the thinnest transparent layer has a thickness of 6 μm to 12 μm.

In still another preferred embodiment, one of the information storage layers that has the greatest optical path length as measured from the surface of the multilayer information storage medium has a depth of 100 μm as measured from the surface of the storage medium.

In yet another preferred embodiment, the laser beam is incident on the multilayer information storage medium through an objective lens that has a numerical aperture of 0.85.

Effects of the Invention

According to the present invention, two information storage layers that sandwich the thinnest transparent layer have a higher returning light intensity and/or a higher degree of modulation than the other information storage layers. That is to say, if information storage layers that would be seriously affected by the interlayer crosstalk had their returning light intensities and degrees of modulation defined in advance so as to reduce the jitter with the influence of the interlayer crosstalk taken into consideration, then information could be read just as intended. According to the present invention, even under the influence of the interlayer crosstalk, it is still possible to prevent any of the information storage layers from having a significantly increased signal jitter. That is to say, by ironing out the difference in jitter level between the respective information storage layers, information can be read and written just as intended.

In one preferred embodiment, to reduce the jitter to be caused by an information storage layer that should be affected by the interlayer crosstalk most seriously, the reflectance of that layer may be defined in advance to be higher than that of any other layer and the signal-to-noise ratio (SNR) of that layer is preferably defined to be highest of all. Then, the increase in jitter due to the crosstalk can be compensated for.

In another preferred embodiment, to reduce the jitter to be caused by an information storage layer that should be affected by the interlayer crosstalk most seriously, the degree of modulation of that layer may be defined in advance to be higher than that of any other layer and the SNR of that layer may be defined to be highest of all. Then, the increase in jitter due to the crosstalk can also be compensated for.

Also, the thinnest transparent layer preferably has a thickness of 6 µm to 12 µm. In that case, when a read/write operation is performed using a head with a laser beam wavelength of 400 nm to 410 nm and an objective lens numerical aperture of 0.85, the influence of the interlayer crosstalk can be minimized and the transparent layer can have a small thickness.

Furthermore, an information storage layer that has the greatest optical path length as measured from the top surface of the multilayer information storage medium preferably has a depth of 100 µm as measured from that surface. Then, the storage medium can be compatible with a read/write head for use in Blu-ray disc recorders and players.

DESCRIPTION OF REFERENCE NUMERALS

101 first substrate
102 first information storage layer (L0 layer)
103 second substrate
104 second information storage layer (L1 layer)
105 third substrate
106 third information storage layer (L2 layer)
107 fourth substrate
108 fourth information storage layer (L3 layer)
109 transparent coating layer
301 first substrate
302 data side
303 reflective film
304 first dielectric film
305 recording film
306 second dielectric film
401 substrate
402, 403, 404 transparent layers
409 transparent coating layer
410 L0 layer
420 L1 layer
430 L2 layer
440 L3 layer

BEST MODE FOR CARRYING OUT THE INVENTION

Hereinafter, preferred embodiments of the present invention will be described with reference to the accompanying drawings. A preferred embodiment of a multilayer information storage medium according to the present invention is an optical disc medium such as a Blu-ray Disc or an HD-DVD (high-definition digital versatile disc). However, the present invention is in no way limited to that specific preferred embodiment. A multilayer information storage medium according to the present invention may also be implemented as a card optical storage medium, a CD (compact disc), a DVD (digital versatile disc), a hologram memory or a near-field memory, for example.

Figure 1:
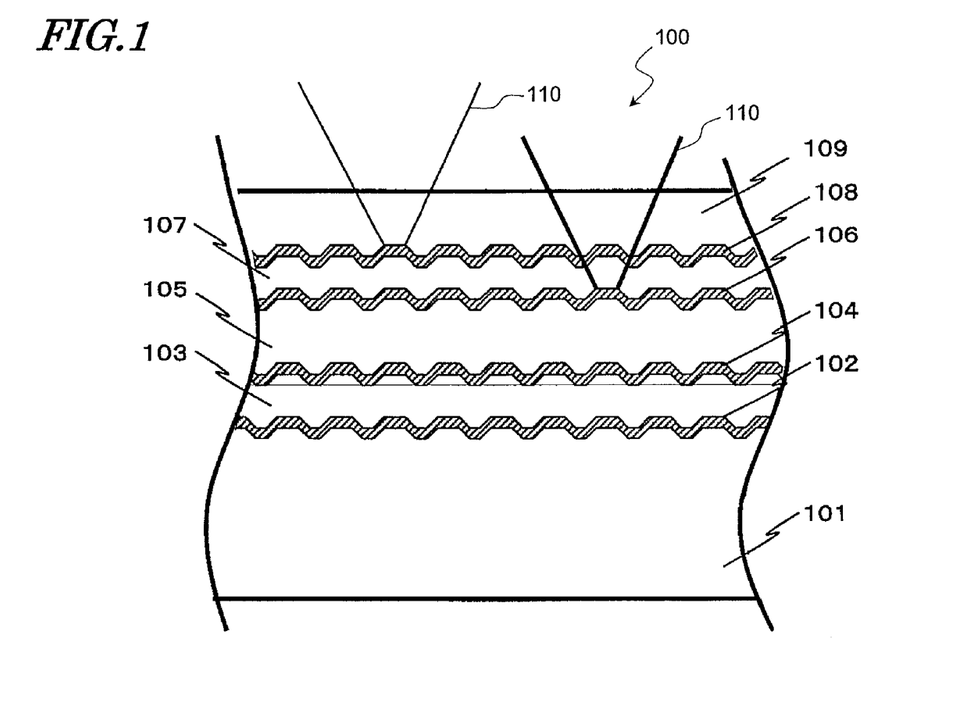
FIG. 1 is a cross-sectional view illustrating a multilayer information storage medium as a preferred embodiment of the present invention.

FIG. 1 is a cross-sectional view illustrating a multilayer information storage medium 100 as a preferred embodiment of the present invention. As shown in FIG. 1, the multilayer information storage medium 100 includes a first substrate 101 and a first information storage layer 102 that is arranged on the data side of the first substrate 101. The first substrate 101 has an uneven data side with pits or guide grooves.

The multilayer information storage medium 100 further includes a second substrate 103 that is arranged on the first information storage layer 102. The second substrate 103 also has an uneven data side with pits or guide grooves, which is opposite to the other side that faces the first substrate 101. The multilayer information storage medium 100 further includes a second information storage layer 104 that is arranged on that data side.

The multilayer information storage medium 100 further includes a third substrate 105 that is arranged on the second information storage layer 104. The third substrate 105 also has an uneven data side with pits or guide grooves, which is opposite to the other side that faces the second substrate 103. The multilayer information storage medium 100 further includes a third information storage layer 106 that is arranged on that data side.

The multilayer information storage medium 100 further includes a fourth substrate 107 that is arranged on the third information storage layer 106. The fourth substrate 107 also has an uneven data side with pits or guide grooves, which is opposite to the other side that faces the third substrate 105. The multilayer information storage medium 100 further includes a fourth information storage layer 108 that is arranged on that data side and a transparent coating layer 109 that is arranged on the fourth information storage layer 108.

The second, third and fourth substrates 103, 105 and 107 will also be referred to herein as "transparent layers".

In order to increase the rigidity of the information storage medium 100 and minimize the warp thereof and to ensure compatibility with other types of optical discs (such as CDs and DVDs), the first substrate 101 is shaped as a circular plate with an outside diameter φ of 120 mm and an average thickness of 1.1 mm. Examples of materials for the first substrate 101 include polycarbonate and an acrylic resin. In this multilayer information storage medium 100, polycarbonate is used as a material for the first substrate 101.

The uneven data side is normally formed when the first substrate 101 is molded using either a metallic stamper or a stamper that is made of a polyolefin resin. The first substrate 101 may be formed by a molding process such as an injection compression molding process. The first substrate 101 has a center hole (not shown) with a diameter φ of 15 mm at the center thereof. Through this center hole, the multilayer information storage medium 100 is held rotatably at a predetermined position in an optical disc drive (which may be a recorder/player or a read-only device) that is going to read or write information from/on it.

If the multilayer information storage medium 100 is a read-only multilayer information storage medium (i.e., a ROM disc), the first information storage layer 102 may be made of a metal such as Al, Ag, Au, Si or $SiO_2$, an alloy thereof, a semiconductor or a dielectric material and may be formed by a sputtering, evaporation or any other suitable process.

Next, the structure of the first information storage layer 102 in a situation where the multilayer information storage medium 100 is a write-once medium will be described with reference to FIG. 2.

Figure 2:
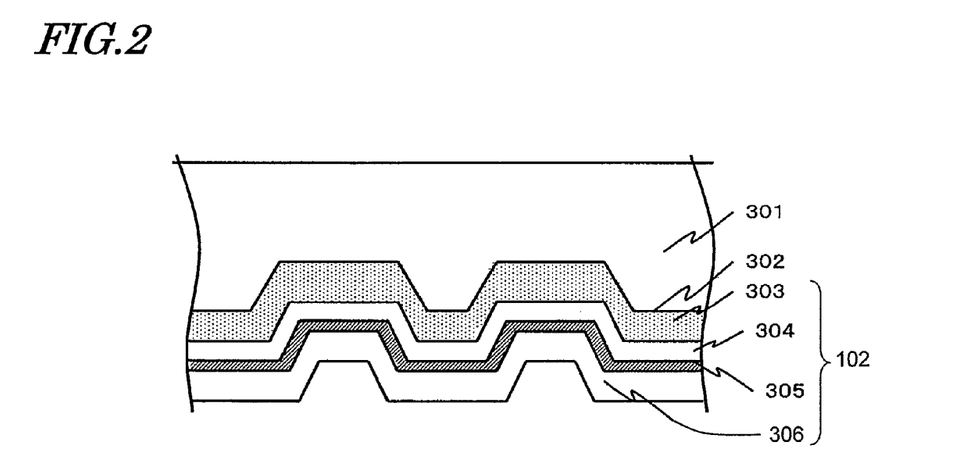
FIG. 2 is a cross-sectional view illustrating information storage layers of a write-once multilayer information storage medium.

In the first information storage layer 102 shown in FIG. 2, a reflective film 303 of an AlCr alloy, a first dielectric film 304 of AlN, a recording film 305 of TeOPd, and a second dielectric film 306 of $ZnS$—$SiO_2$ may be stacked in this order on the data side 302 of the first substrate 301. All of these thin films may be deposited by a sputtering, evaporation or any other suitable process. However, the types, number, materials and order of these thin films to be stacked one upon the other are not limited to the ones adopted in this example. For example, as a material for the reflective film 303, AlCr may be replaced with an alloy material that includes a metal such as Ag or Au as a main ingredient as in a read-only multilayer information storage medium.

The second, third and fourth information storage layers 104, 106 and 108 each have the same structure as the first information storage layer 102. By adjusting the thickness or material composition of the reflective film 303 or removing the reflective film 303 and/or adjusting the thicknesses of the first dielectric film 304 and recording film 305, the optical properties of the multilayer information storage medium 100 are controllable. In this preferred embodiment, the material of the recording film 305 is supposed to be TeOPd. However, any other recording material for a write-once storage medium may be used instead. Furthermore, the first through fourth information storage layers 102, 104, 106 and 108 may further include a pigment film (not shown).

The transparent layers (i.e., the second, third and fourth substrates 103, 105 and 107) are substantially transparent to the laser beam 110 for reading and writing. These transparent layers may either be plate substrates or formed by applying and curing a liquid resin on the information storage layer. The second, third and fourth substrates 103, 105 and 107 are preferably made of a UV curable resin consisting essentially of an acrylic resin. A UV curable resin is highly responsive to only light falling within the ultraviolet range and cures when exposed to such light. That is why in the process of making the second, third and fourth substrates 103, 105 and 107, even if a resin-containing dye that has been applied onto the information storage layers 102, 104, 106 and 108 were heated with an electromagnetic wave that has a longer wavelength than an ultraviolet ray, the surface of the resin-containing dye could be planarized without curing the UV curable resin included in the resin-containing dye.

The transparent coating layer 109 is substantially transparent to (i.e., can transmit) read/write light, and may be made of a UV curable resin consisting essentially of an acrylic resin, for example. The transparent coating layer 109 may be formed by applying and spreading a liquid UV curable resin on the fourth information storage layer 108 by a spin coating process. The transparent coating layer 109 thus formed covers the respective substrates and information storage layers and is bonded to the first substrate at the inner and outer edges of the storage medium (not shown). To minimize the occurrence of read/write errors due to dust or scratches on the laser beam incoming side, it is important to define the thickness of the transparent coating layer 109 appropriately. Generally speaking, the greater the thickness, the higher the resistance to dust or scratches. For example, in a normal environment where an optical disc is handled, 90% or more of the dust has sizes of 30 μm or less (according to ISOM/ODS 2002), and therefore, the transparent coating layer needs to be thick enough to avoid being affected by such dust with sizes of 30 μm or less. In view of this consideration, in this preferred embodiment, the transparent coating layer has a thickness of approximately 60 μm.

In this preferred embodiment, the second substrate has a thickness of 13.5±1.5 μm, the third substrate 105 has a thickness of 17.5±1.5 μm, and the fourth substrate 107 has a thickness of 9.5±1.5 μm. That is to say, if the thicknesses of the transparent layers are identified by A, B, C and D in the order of closeness to the substrate 101, then A, B and C satisfy the inequality C<A<B. By making the thicknesses of these transparent layers different in this manner, it is possible to prevent an interlayer crosstalk (or noise) from being produced due to interference between the laser beam 110 that has been focused on, and then reflected from, the target information storage layer 102 or 104 and another laser beam 110 that has been accidentally focused on, and then reflected from, another information storage layer that is located closer to the laser beam incoming side than the target layer is. The thinnest transparent layer 107 preferably has a thickness of 6 μm to 12 μm.

Also, to ensure compatibility between a single-layer Blu-ray Disc (with a storage capacity of 25 GB) and a dual-layer Blu-ray Disc (with a storage capacity of 50 GB) during reading and writing, the overall thickness of the second to fourth substrates 103, 105 and 107 and the transparent coating layer 109, i.e., the distance from the surface of the information storage medium (i.e., read/write light incoming side) to the information storage layer 102, is defined to be approximately 100 μm, which is equal to the distance from the read/write light incoming side of the Blu-ray Disc to the reference layer (i.e., L0 layer). The reference layer of the Blu-ray Disc is the information storage layer that has the greatest optical path length as measured from the read/write light incoming side. The information storage layer 102 has the greatest optical path length as measured from the surface of the multilayer information storage medium 100. Considering a margin left for the thicknesses of the transparent layers (i.e., a margin of ±1.5 μm to be left for a substrate being made), the fourth substrate 107 needs to have a thickness of at least 8.0 µm. However, the thicknesses are not limited to these values.

Hereinafter, the read/write performance of a write-once multilayer information storage medium will be described with reference to the following Table 1:

TABLE 1

| Information storage layer to read from | Signal stored? | | | | Jitter (%) |
|---|---|---|---|---|---|
| | L0 | L1 | L2 | L3 | |
| L0 | YES | NO | NO | NO | 6.1 |
| | YES | YES | NO | NO | 6.1 |
| | YES | YES | YES | NO | 6.2 |
| | YES | YES | YES | YES | 6.1 |
| L1 | NO | YES | NO | NO | 7.8 |
| | YES | YES | NO | NO | 7.8 |
| | YES | YES | YES | NO | 7.9 |
| | YES | YES | YES | YES | 7.8 |
| L2 | NO | NO | YES | NO | 7.9 |
| | YES | YES | YES | NO | 7.8 |
| | YES | YES | YES | YES | 8.2 |
| L3 | NO | NO | NO | YES | 7.8 |
| | YES | YES | YES | YES | 8.2 |

In the example shown in Table 1, a write-once multilayer information storage medium, of which the second, third and fourth substrates 103, 105 and 107 had thicknesses of 13.5 µm, 17.5 µm and 9.5 µm, respectively, was used. To evaluate the quality of the signal stored on that storage medium, the jitter was measured as an electrical characteristic using a recorder/player including an optical head having a light source emitting a laser beam 110 with a wavelength of approximately 400 nm and a condenser lens with a numerical aperture (NA) of 0.85. The laser beam 110 preferably had a wavelength of 400 nm to 410 nm. Also, the laser beam 110 was supposed to be incident perpendicularly onto the multilayer information storage medium 100 through the transparent coating layer after having been transmitted through an objective lens with a numerical aperture of 0.85. As used herein, the "jitter" means the error rate of a signal when information stored on a storage medium is read. The smaller the jitter, the less likely errors will occur. With potential influence of crosstalk that could be caused by another layer when information is being read from a target information storage layer taken into consideration, Table 1 shows not only jitter values when information was stored only in the target information storage layer and then read from that layer but also jitter values when information was also stored in non-target information storage layers other than the target one.

Also, the thicknesses of the reflective, dielectric and recording films of the respective information storage layers were adjusted such that the respective information storage layers had the same returning light intensity and the same degree of modulation. Specifically, the reflectance was defined such that approximately 4% of incoming laser beam was reflected from each of those information storage layers and that those layers had a degree of modulation of 40%.

As used herein, the "returning light intensity" refers to the intensity of the light that has been reflected back from an information storage layer as measured when that light leaves the surface of the storage medium. The "degree of modulation" means the ratio of a local maximum value in one period of an analog signal to the amplitude thereof. Specifically, supposing an analog signal has a local maximum value X and a local minimum value Y in one period thereof, the degree of modulation M is calculated by $M=(X-Y)/X$. It can be said that the greater the difference in brightness between light beams reflected when information is read continuously from a series of recording marks or mark-to-mark spaces on an information storage layer, the greater the degree of modulation.

According to Table 1, it can be seen that the jitter increased in the third and fourth information storage layers 106 and 108 (which are identified by L2 and L3, respectively, in Table 1) sandwiching the thinnest substrate 107 (with a thickness of 9.5 µm) between them. This is probably because due to the small thickness of that substrate, those information storage layers had too narrow an interval to avoid the influence of interference of diffracted light between the information storage layers (i.e., interlayer interference).

Next, the jitters to be caused by a dual-layer disc, which includes only L2 and L3 layers with neither L0 layer nor L1 layer included and of which the transparent layer 107 has varied thicknesses, will be described with reference to the following Table 2:

TABLE 2

| Thickness (µm) of transparent layer 107 | Information storage layer to read from | Signal stored? | | Jitter (%) |
|---|---|---|---|---|
| | | L2 | L3 | |
| 15 | L2 | YES | NO | 7.9 |
| 15 | | YES | YES | 7.8 |
| 15 | L3 | NO | YES | 7.8 |
| 15 | | YES | YES | 7.8 |
| 12 | L2 | YES | NO | 7.8 |
| 12 | | YES | YES | 8.0 |
| 12 | L3 | NO | YES | 7.8 |
| 12 | | YES | YES | 8.0 |
| 10 | L2 | YES | NO | 7.9 |
| 10 | | YES | YES | 8.3 |
| 10 | L3 | NO | YES | 7.8 |
| 10 | | YES | YES | 8.2 |
| 8 | L2 | YES | NO | 7.8 |
| 8 | | YES | YES | 8.5 |
| 8 | L3 | NO | YES | 7.8 |
| 8 | | YES | YES | 8.4 |
| 6 | L2 | YES | NO | 7.9 |
| 6 | | YES | YES | 9.2 |
| 6 | L3 | NO | YES | 7.8 |
| 6 | | YES | YES | 9.4 |
| 4 | L2 | Non-readable and non-writable | | |
| 4 | | | | |
| 4 | L3 | | | |
| 4 | | | | |

According to Table 2, it can be seen that if the transparent layer 107 had a thickness of 12 μm or less, the jitter increased, and interlayer crosstalk occurred, in a situation where information was stored in any non-target information storage layer compared to a situation where no information was stored in any non-target information storage layer. It should be noted that when the transparent layer 107 had a thickness of 4 μm, the laser beam could no longer be focused on the information storage layer with stability and the jitter could not be measured. This is probably because there was significant influence of crosstalk caused by the other layers.

To read information from the information storage layers just as intended, the L0 layer preferably has a jitter value of 6.5% or less, and the L1 to L3 layers preferably have jitter values of 8.5% or less. Considering variations that could be caused when discs are made, the L0 layer more preferably has a jitter value of 6.0% or less and the L1 to L3 layers more preferably have jitter values of 8.0% or less. The L0 layer should have a smaller jitter than the L1, L2 or L3 layer because the L0 layer is most easily affected by aberration when information is read from the L0 layer by passing the laser beam 110 through the transparent layers and the transparent coating layer. The aberration is produced when the optical path length varies due to the warp of a substrate, for example. Thus, by setting in advance the jitter to be caused by the L0 layer smaller than those of the other layers, information can be read and written just as intended. On the other hand, the L1, L2 and L3 layers, which are light-transmitting information storage layers, will cause little variation in optical path length due to the warp of the substrate, and therefore, may have larger jitter values than the L0 layer.

In this case, the jitter to be caused by the L0 layer can be smaller than the ones to be caused by the L1, L2 and L3 layers because these information storage layers have different structures. Specifically, the L0 layer may have a structure that does not transmit light unlike the other light-transmitting layers, and therefore, may include a thick metallic reflective layer that can minimize the diffusion of heat in the information storage layer during writing. By suppressing the diffusion of heat, the recording marks can have an increased contrast ratio and the jitter can be reduced.

Embodiment 1

Hereinafter, a write-once multilayer information storage medium 100 will be described as a first preferred embodiment of the present invention.

In the multilayer information storage medium of the present invention, when a laser beam with a wavelength of 400 nm to 410 nm is incident perpendicularly on the medium through the transparent coating layer thereof, two of the information storage layers that sandwich the thinnest one of the transparent layers have a higher returning light intensity and/or a higher degree of modulation than the other information storage layers. In the following example, a multilayer information storage medium, in which the two information storage layers that sandwich the thinnest transparent layer have a higher returning light intensity than the other layers, will be described. A multilayer information storage medium, in which the two information storage layers that sandwich the thinnest transparent layer have a higher degree of modulation than the other layers, will be described later. Optionally, the two information storage layers that sandwich the thinnest transparent layer may have a higher returning light intensity and a higher degree of modulation than the other layers.

It is generally known that the jitter level can be determined to be high or low basically by the magnitude of the SNR. That is why to decrease the jitter to a sufficiently low level, the signal may either be amplified or have its noise reduced. The write-once multilayer information storage medium 100 of this preferred embodiment defines, for each of the information storage layers, the best reflectance that will not only amplify the signal representing information read from that information storage layer but also reduce the noise from the other information storage layers, thereby equalizing the jitter levels when information is read from those information storage layers.

More specifically, the returning light intensities of the L2 and L3 layers, of which the jitters vary significantly due to the influence of the other information storage layers, are increased, while those of the L0 and L1 layers, which are affected little by the crosstalk caused by the other layers, are decreased. Then, the jitters to be caused when information is read from the respective information storage layers can be equalized just by making a simple structural change.

In this preferred embodiment, after information has been written on every information storage layer, the respective information storage layers are supposed to have the following reflectances. Specifically, the L0 and L1 layers are supposed to have a reflectance of 3.5% to less than 4.0%, and the L2 and L3 layers are supposed to have a reflectance of 4.0% to less than 5.0%. In this manner, the intensity of the light returning from the L2 and L3 layers is increased from 4% to 5%, while that of the light returning from the L0 and L1 layers is decreased from 4% to 3.5%. The second, third and fourth substrates 103, 105 and 107 have thicknesses of 13.5 μm, 17.5 μm and 9.5 μm, respectively.

The following Table 3 shows how much the jitter changed when a read/write operation was performed on the write-once multilayer information storage medium 100 of this preferred embodiment.

TABLE 3

| Information storage layer to read from | Signal stored? | | | | Jitter (%) |
|---|---|---|---|---|---|
| | L0 | L1 | L2 | L3 | |
| L0 | YES | NO | NO | NO | 6.2 |
| | YES | YES | NO | NO | 6.2 |
| | YES | YES | YES | NO | 6.2 |
| | YES | YES | YES | YES | 6.2 |
| L1 | NO | YES | NO | NO | 8.0 |
| | YES | YES | NO | NO | 8.1 |
| | YES | YES | YES | NO | 8.0 |
| | YES | YES | YES | YES | 8.0 |
| L2 | NO | NO | YES | NO | 7.6 |
| | YES | YES | YES | NO | 7.7 |
| | YES | YES | YES | YES | 8.0 |
| L3 | NO | NO | NO | YES | 7.6 |
| | YES | YES | YES | YES | 8.1 |

If information was written on, and read from, only one of the information storage layers, the jitters caused by the L2 and L3 layers decreased, and the ones caused by the L0 and L1 layers increased, according to the results shown in this Table 3, compared to the ones shown in Table 1. It should be noted that the jitters shown in Table 1 are those of a multilayer information storage medium that was fabricated by stacking one upon the other a number of information storage layers, each of which would have substantially the same returning light intensity if it were used to make a single-layer information storage medium. It can also be seen that in the example shown in Table 3, the jitters that were caused under the influence of interlayer crosstalk, produced by writing information on other layers, too, had been substantially equalized with each other.

Generally speaking, a read signal is affected by crosstalk, system noise and various other factors. In the multilayer information storage medium of this preferred embodiment, however, the intensity of the light returning from the L2 and L3 layers has its absolute value increased, thus increasing the absolute value of the difference in amplitude between a regular signal (S) and noise (N). As a result, a read operation can be performed with good stability.

In this example, if the L0 and L1 layers of the write-once multilayer information storage medium 100 have a reflectance of 2.5%, the L2 and L3 layers thereof have a reflectance of 6.3% and the degree of modulation of these layers is 40%, then the L0, L1, L2 and L3 layers have jitters of 6.8%, 8.7%, 7.5% and 7.6%, respectively, which are not equal to each other. To equalize these jitters with each other, the reflectances need to be optimized.

The best reflectances are defined as follows.

Specifically, if the multilayer information storage medium 100 is a write-once type, then (jitter of L0 layer)≦6.5% and (jitters of L1 to L3 layers)≦8.5% are preferably satisfied, the L0 and L1 layers preferably have a reflectance of 3.0% to less than 4.0%, and the L2 and L3 layers preferably have a reflectance of 4.0% to less than 6.0%. Also, to strike a proper balance between the jitters of the respective layers, the L0 and L1 layers more preferably have a reflectance of 3.5% to less than 4.0%, and the L2 and L3 layers more preferably have a reflectance of 4.0% to less than 5.0%.

On the other hand, if the multilayer information storage medium 100 is a rewritable one, then (jitter of L0 layer) ≦6.5% and (jitters of L1 to L3 layers)≦8.5% are preferably satisfied, the L0 and L1 layers preferably have a reflectance of 1.5% to less than 2.5%, and the L2 and L3 layers preferably have a reflectance of 2.5% to less than 3.5%. Also, to strike a proper balance between the jitters of the respective layers, the L0 and L1 layers more preferably have a reflectance of 2.0% to less than 2.5%, and the L2 and L3 layers more preferably have a reflectance of 2.5% to less than 3.0%.

Furthermore, if the multilayer information storage medium 100 is a read-only one, then (jitter of L0 layer)≦6.5% and (jitters of L1 to L3 layers)≦8.5% are preferably satisfied, the L0 and L1 layers preferably have a reflectance of 10% to less than 20%, and the L2 and L3 layers preferably have a reflectance of 20% to less than 30%. Also, to strike a proper balance between the jitters of the respective layers, the L0 and L1 layers more preferably have a reflectance of 15% to less than 20%, and the L2 and L3 layers more preferably have a reflectance of 20% to less than 25%.

As described above, according to this preferred embodiment, the jitter is decreased in advance by increasing the reflectance of an information storage layer that would be easily affected by interlayer crosstalk. As a result, even if interlayer crosstalk were produced, no information storage layer would have a significantly increased jitter. In addition, by ironing out the difference in jitter level between the respective information storage layers, information can be read with good stability.

Embodiment 2

Hereinafter, a write-once multilayer information storage medium 100 will be described as a second preferred embodiment of the present invention.

In the write-once multilayer information storage medium 100 of the first preferred embodiment described above, a signal read from an information storage layer that would be seriously affected by the interlayer crosstalk is amplified to a greater degree, thereby increasing its SNR and equalizing the jitters to be caused when information is read from the respective information storage layers. Meanwhile, in the write-once multilayer information storage medium 100 of this preferred embodiment, the signal read from the target information storage layer is amplified to a greater degree by optimizing the degrees of modulation between the respective layers, thereby equalizing the jitters to be caused when information is read from the respective information storage layers.

More specifically, the degrees of modulation of the L2 and L3 layers, of which the jitters vary significantly due to the influence of the other information storage layers, are increased, while those of the L0 and L1 layers, which are affected little by the crosstalk, are decreased. Then, the jitters to be caused when information is read from the respective information storage layers can be equalized just by making a simple structural change.

In this preferred embodiment, by increasing the thicknesses of the information storage layers L2 and L3, the degree of modulation of the L2 and L3 layers is increased from 40% to 45%, while that of the L0 and L1 layers is decreased from 40% to 35%. The second, third and fourth substrates 103, 105 and 107 have thicknesses of 13.5 μm, 17.5 μm and 9.5 μm, respectively.

The following Table 4 shows how much the jitter changed when a read/write operation was performed on the write-once multilayer information storage medium 100 of this preferred embodiment.

TABLE 4

| Information storage layer to read from | Signal stored? | | | | Jitter (%) |
|---|---|---|---|---|---|
| | L0 | L1 | L2 | L3 | |
| L0 | YES | NO  | NO  | NO  | 6.2 |
|    | YES | YES | NO  | NO  | 6.3 |
|    | YES | YES | YES | NO  | 6.3 |
|    | YES | YES | YES | YES | 6.2 |
| L1 | NO  | YES | NO  | NO  | 7.9 |
|    | YES | YES | NO  | NO  | 7.9 |
|    | YES | YES | YES | NO  | 7.9 |
|    | YES | YES | YES | YES | 8.0 |
| L2 | NO  | NO  | YES | NO  | 7.5 |
|    | YES | YES | YES | NO  | 7.8 |
|    | YES | YES | YES | YES | 7.9 |
| L3 | NO  | NO  | NO  | YES | 7.8 |
|    | YES | YES | YES | YES | 8.0 |

If information was written on, and read from, only one of the information storage layers, the jitters caused by the L2 and L3 layers decreased, and the ones caused by the L0 and L1 layers increased, according to the results shown in this Table 4, compared to the ones shown in Table 1. It should be noted that the jitters shown in Table 1 are those of an information storage medium, of which the information storage layers had the same degree of modulation. It can also be seen that in the example shown in Table 4, the jitters that were caused under the influence of interlayer crosstalk, produced by writing information on other layers, too, had been substantially equalized with each other.

Generally speaking, a read signal is affected by crosstalk, system noise and various other factors. In the multilayer information storage medium of this preferred embodiment, however, the degree of modulation of the L2 and L3 layers is increased, thus increasing the absolute value of the difference in amplitude between a regular signal (S) and noise (N). As a result, a read operation can be performed with good stability.

In this example, if the L0 and L1 layers of the write-once multilayer information storage medium 100 have a degree of modulation of 25%, the L2 and L3 layers thereof have a degree of modulation of 50% and the reflectance of these layers is 4%, then the L0, L1, L2 and L3 layers have jitters of 7.0%, 8.8%, 7.5% and 7.5%, respectively, which are not equal to each other. To equalize these jitters with each other, the degrees of modulation need to be optimized.

The best degrees of modulation are defined as follows. Specifically, if the multilayer information storage medium 100 is a write-once type, then (jitter of L0 layer)$\leq$6.5% and (jitters of L1 to L3 layers)$\leq$8.5% are preferably satisfied, the L0 and L1 layers preferably have a degree of modulation of 30% to less than 40%, and the L2 and L3 layers preferably have a degree of modulation of 40% to less than 50%. Also, to strike a proper balance between the jitters of the respective layers, the L0 and L1 layers more preferably have a degree of modulation of 35% to less than 40%, and the L2 and L3 layers more preferably have a degree of modulation of 40% to less than 45%.

On the other hand, if the multilayer information storage medium 100 is a rewritable one, then (jitter of L0 layer) $\leq$6.5% and (jitters of L1 to L3 layers)$\leq$8.5% are preferably satisfied, the L0 and L1 layers preferably have a degree of modulation of 35% to less than 45%, and the L2 and L3 layers preferably have a degree of modulation of 45% to less than 55%. Also, to strike a proper balance between the jitters of the respective layers, the L0 and L1 layers more preferably have a degree of modulation of 40% to less than 45%, and the L2 and L3 layers more preferably have a degree of modulation of 45% to less than 50%.

Furthermore, if the multilayer information storage medium 100 is a read-only one, then (jitter of L0 layer)$\leq$6.5% and (jitters of L1 to L3 layers)$\leq$8.5% are preferably satisfied, the L0 and L1 layers preferably have a degree of modulation of 50% to less than 60%, and the L2 and L3 layers preferably have a degree of modulation of 60% to less than 70%. Also, to strike a proper balance between the jitters of the respective layers, the L0 and L1 layers more preferably have a degree of modulation of 55% to less than 60%, and the L2 and L3 layers more preferably have a degree of modulation of 60% to less than 65%.

As described above, according to this preferred embodiment, the jitter is decreased in advance by increasing the degree of modulation of an information storage layer that would be easily affected by interlayer crosstalk. As a result, even if interlayer crosstalk were produced, no information storage layer would have a significantly increased jitter. In addition, by ironing out the difference in jitter level between the respective information storage layers, information can be read with good stability.

In the foregoing description of preferred embodiments, a multilayer information storage medium with four information storage layers has been described as an example. However, the present invention is in no way limited to those specific preferred embodiments. Instead, the numbers of information storage layers may also be changed into two, three or even five or more by adjusting the thicknesses of the first substrate, transparent layers and transparent coating layer. A huge amount of information can be read from, and written on, an information storage medium with multiple information storage layers.

Also, in the preferred embodiments described above, each of the first through fourth information storage layers has a structure in which the reflective film 303, first dielectric film 304, recording film 305 and second dielectric film 306 are stacked in this order on the first substrate as shown in FIG. 2. However, this structure does not have to be used. Instead, each information storage layer has only to include at least a film that reflects the incoming laser beam and at least one of the other films may be removed or any other film may be added when needed.

Furthermore, in the preferred embodiments described above, only one transparent layer (i.e., the transparent layer 107) is supposed to cause the interlayer crosstalk easily. However, even if there are two or more transparent layers that would cause the interlayer crosstalk easily, the increase in jitter can also be minimized by a similar method.

Furthermore, even if the respective information storage layers are affected by the crosstalk to mutually different degrees, the same effects can also be achieved by defining the reflectances or degrees of modulation of the respective layers such that the more significantly one layer would be affected by the crosstalk, the greater its reflectance or degree of modulation is.

As described above, in a multilayer information storage medium including a transparent layer that is thick enough to cause interlayer crosstalk, if the reflectance or degree of modulation of an information storage layer to be affected by the crosstalk is defined to be higher than that of another information storage layer not to be affected by the crosstalk, the increase in jitter to be caused when information is read from the information storage layer affected by the interlayer crosstalk can be minimized. The present invention provides not only a system for reading and writing information from/on a multilayer information storage medium but also an improved multilayer information storage medium itself.

INDUSTRIAL APPLICABILITY

The present invention is applicable particularly effectively to the field of multilayer information storage media with multiple information storage layers.

The invention claimed is:

1. A multilayer information storage medium comprising:
a substrate;
at least three information storage layers, which are stacked one upon the other on the substrate;
a plurality of transparent layers, each of which is arranged between its associated adjacent ones of the information storage layers; and
a transparent coating layer,
wherein at least two of the transparent layers have mutually different thicknesses, and wherein if a laser beam with a wavelength of 400 nm to 410 nm is incident perpendicularly on the medium through the transparent coating layer, two of the information storage layers that sandwich the thinnest one of the transparent layers have a higher returning light intensity and/or a higher degree of modulation than the other information storage layers.

2. The multilayer information storage medium of claim 1, wherein the medium includes four information storage layers, and wherein the transparent layers arranged between those information storage layers have mutually different thicknesses, and wherein if the thicknesses of the transparent layers are identified by A, B and C in the order of closeness to the substrate, then A, B and C satisfy the inequality C<A<B.

3. The multilayer information storage medium of claim 1, wherein the thinnest transparent layer has a thickness of 6 μm to 12 μm.

4. The multilayer information storage medium of claim 1, wherein one of the information storage layers that has the greatest optical path length as measured from the surface of the multilayer information storage medium has a depth of 100 μm as measured from the surface of the storage medium.

5. The multilayer information storage medium of claim 1, wherein the laser beam is incident on the multilayer information storage medium through an objective lens that has a numerical aperture of 0.85.

* * * * *